US009344466B1

(12) United States Patent
Abuzalaf et al.

(10) Patent No.: US 9,344,466 B1
(45) Date of Patent: May 17, 2016

(54) METHODS AND SYSTEMS FOR FACILITATING ONLINE COLLABORATION AND DISTRIBUTION OF GEOSPATIAL DATA

(75) Inventors: Sam Abuzalaf, Hacienda Heights, CA (US); Carl Suttle, San Jose, CA (US); Namejs Reinbachs, Boulder Creek, CA (US)

(73) Assignee: Leidos, Inc., Reston, VA (US)

( * ) Notice: Subject to any disclaimer, the term of this patent is extended or adjusted under 35 U.S.C. 154(b) by 1048 days.

(21) Appl. No.: 11/043,553

(22) Filed: Jan. 26, 2005

Related U.S. Application Data

(60) Provisional application No. 60/540,460, filed on Jan. 30, 2004.

(51) Int. Cl.
*G06F 15/16* (2006.01)
*H04L 29/06* (2006.01)

(52) U.S. Cl.
CPC .................................. *H04L 65/4015* (2013.01)

(58) Field of Classification Search
CPC .................................................. H04L 65/4015
USPC .................................................. 709/224, 204
See application file for complete search history.

(56) References Cited

U.S. PATENT DOCUMENTS

| | | | |
|---|---|---|---|
| 5,751,576 A * | 5/1998 | Monson | 700/83 |
| 6,269,080 B1 * | 7/2001 | Kumar | 370/236 |
| 6,983,313 B1 * | 1/2006 | Korkea-Aho | 709/219 |
| 2002/0073059 A1 * | 6/2002 | Foster et al. | 707/1 |
| 2002/0188669 A1 * | 12/2002 | Levine | 709/203 |
| 2003/0018719 A1 * | 1/2003 | Ruths | G06F 9/52 709/205 |
| 2003/0167333 A1 * | 9/2003 | Kumar et al. | 709/227 |
| 2004/0083237 A1 * | 4/2004 | Burnett | 707/104.1 |
| 2004/0103147 A1 * | 5/2004 | Flesher et al. | 709/204 |
| 2004/0139158 A1 * | 7/2004 | Datta | 709/205 |
| 2005/0055306 A1 * | 3/2005 | Miller et al. | 705/37 |
| 2005/0138081 A1 * | 6/2005 | Alshab et al. | 707/200 |
| 2005/0288959 A1 * | 12/2005 | Eraker et al. | 705/1 |
| 2006/0015624 A1 * | 1/2006 | Smith et al. | 709/227 |

* cited by examiner

*Primary Examiner* — Jason Recek

(74) *Attorney, Agent, or Firm* — Dawn-Marie Bey; Bey & Cotropia PLLC

(57) ABSTRACT

Improved methods, systems, and software for facilitating online collaboration and distribution of geospatial data are provided. Geospatial data available over a network can be updated in real-time and provided to one or more clients. User-accessible views of the geospatial data can be dynamically built by the clients and presented to users of the clients. Various methods of online collaboration between users of the clients can also be supported. The geospatial data can be provided in an XML format, thereby providing for efficient communication of data over the network. In various embodiments, the geospatial data can be an annotation prepared by a user of a second client, thereby allowing the user of the second client to collaborate with a user of the first client. Functionality can also be provided for converting geospatial data between flat and spherical formats.

14 Claims, 10 Drawing Sheets

METHODS AND SYSTEMS FOR FACILITATING ONLINE COLLABORATION AND DISTRIBUTION OF GEOSPATIAL DATA

CROSS-REFERENCE TO RELATED APPLICATIONS

This application relates to and claims the benefit of U.S. Provisional Application No. 60/540,460 filed Jan. 30, 2004 and entitled Method and System for Providing Geospatial Collaboration, which is incorporated by reference herein.

BACKGROUND OF THE INVENTION

1. Field of the Invention

The present invention is directed to technology for facilitating communication of geospatial data.

2. Description of the Related Art

In recent years, the proliferation of networked computing systems and the Internet has greatly expanded the methods in which users can communicate with each other. Such technology has improved the ability of users to transfer information and data through increasingly convenient ways.

Unfortunately, existing data communication methods and systems often fail to provide sufficient flexibility and efficiency for communicating and exchanging certain types of data. Notably, existing data systems and related methods do not always efficiently manage the communication of geospatial data. Due to the large amounts of geospatial data required to perform meaningful analysis, the communication of such data over networks can consume large amounts of bandwidth, thereby reducing the efficiency of such communication.

Moreover, geospatial data often must be updated in realtime to ensure that users of the data are provided with an accurate and representation of critical information. Nevertheless, existing methods and systems for providing geospatial data do not always provide such updated data in an efficient manner. It can be impractical for users to download large amounts of data, and then be forced to re-download such data when only a portion or attribute of the total data has changed.

In addition, users of geospatial may wish to share data with each other. However, it can be difficult to discuss such shared data when users are located remotely from each other. For example, although it may be possible for users to exchange email messages and conduct teleconferences when discussing the shared data, such communication methods may not necessarily allow users to fully understand each other's comments in the context of the shared data. Differing security permissions between users can further complicate the ability for users to access the same data.

As such, there exists a need for an improved way of facilitating the communication and user collaboration of geospatial data.

BRIEF SUMMARY OF THE INVENTION

Various aspects of the present invention, roughly described, provide improved methods, systems, and software for facilitating online collaboration and distribution of geospatial data. In various embodiments, geospatial data available over a network can be updated in real-time and provided to one or more clients. User-accessible views of the geospatial data can be dynamically built by the clients and presented to users of the clients. Various methods of online collaboration between users of the clients can also be supported.

In one embodiment, a machine-implemented method for facilitating the distribution of a plurality of geospatial data over a network is provided. A state associated with geospatial data received from a data source can be maintained by a server. A list of changes associated with the geospatial data can also be maintained by the server. Updated geospatial data can be received from the data source over the network and stored in the list. In response to a data polling request from a client over the network, the updated geospatial data can be forwarded to the client over the network.

The geospatial data can be provided in an XML format, thereby providing for efficient communication of data over the network. In various embodiments, the geospatial data can comprise an annotation prepared by a user of a second client, thereby allowing the user of the second client to collaborate with a user of the first client. Functionality can also be provided for converting geospatial data between flat and spherical formats.

In yet another embodiment, a machine-implemented method for facilitating client interaction with geospatial data over a network can be provided. A project can be accessed, the project comprising a plurality of views and links to geospatial data available from a plurality of data sources. Geospatial data from one of the plurality of data sources can be downloaded. A server can be polled for updates to the geospatial data, and an update to the geospatial data can be received wherein the update comprises a subset of the geospatial data.

These as well as other embodiments contemplated by the present invention will be more fully set forth in the detailed description below and the figures submitted herewith.

DETAILED DESCRIPTION OF THE INVENTION

Figure 1:
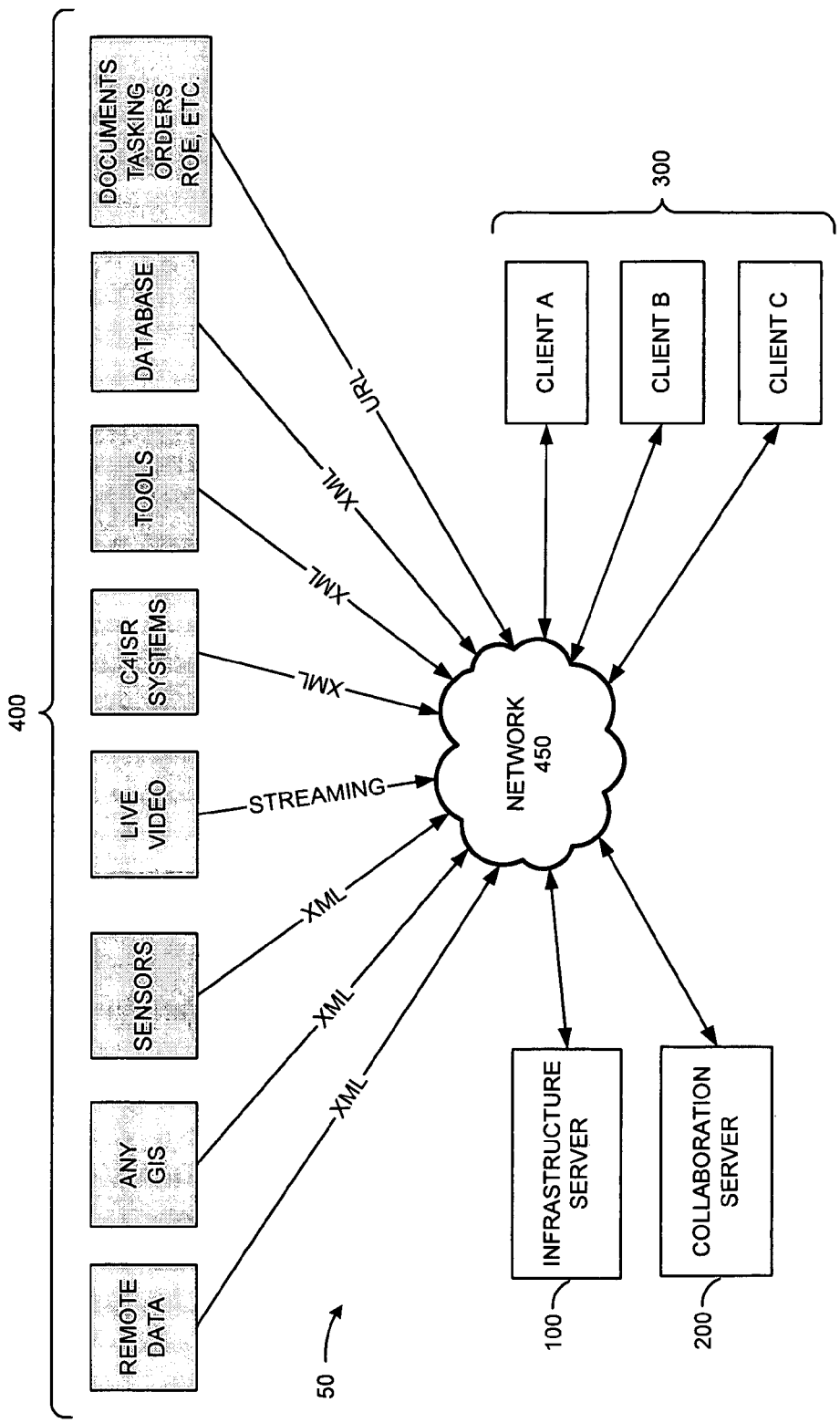
FIG. 1 illustrates a block diagram of a system for distributing geospatial data in accordance with an embodiment of the present invention.

FIG. 1 illustrates a block diagram of a system 50 for distributing geospatial data in accordance with an embodiment of the present invention. Geospatial data can take many forms, including but not limited to: (1) mathematical descriptions of the world (i.e. WGS84); (2) imagery and maps that add visual value to the earth; (3) vector overlays describing fixed things on earth (i.e. natural and manmade structures); (4) dynamic objects that change in a temporal manner (i.e. movement, sensors, etc.); and (5) other data. As such, it will be appreciated that geospatial data as described herein can refer to any data representation of geographic data.

System 50 provides hardware and software for network communication of geospatial data between the various components of the system 50. By interfacing with system 50 through one or more lightweight, easily deployable clients 300, users of the clients 300 can be permitted to view and interact with geospatial data, and also collaborate with each other in relation to such geospatial data. Multi-dimensional views of the data can be accessed and dynamically built by clients 300. In addition, real time graphical annotations, data, views, and orientations can be shared between clients 300.

As illustrated in FIG. 1, system 50 includes an infrastructure server 100, collaboration server 200, clients 300, and a plurality of data sources 400 in communication with a network 450. Through the interaction between these various components as further described herein, clients 300 can view real-time visual representations of geospatial data provided from any combination of data sources 400.

System 50 can support interaction with a variety of disparate data sources 400 (i.e. "resources") which may be any source of geospatial data in communication with network 450. As the data available from data sources 400 changes over time, those changes can be processed by collaboration server 200 and efficiently provided to and displayed on one or more clients 300, as further described herein.

It is contemplated that data sources 400 can provide the various types of data depicted in FIG. 1, as well as any other appropriate type of geospatial data. As illustrated, it is contemplated that in various embodiments, the data sources 400 can interact with system 50 through the exchange of XML messages, URLs, and/or streaming. Alternatively, data from data sources 400 can be provided in any desired data format and converted into an appropriate XML format by server 100, server 200, and/or clients 300, thereby permitting the data to be used in an XML format when processed by system 50. Moreover, data sources 400 can provide XML metadata describing where to find and how to convert geospatial data into an appropriate format compatible with components of system 50 to facilitate user collaboration with the geospatial data.

Servers 100 and 200 can be implemented in accordance with any appropriate server technology known in the art. In one embodiment, servers 100 and 200 are implemented with one or more Intel processors, Windows 2000 and/or Windows XP Professional operating systems, Microsoft Internet Information Services 5.0, and appropriate server software supporting the various server functionality further described herein. In another embodiment, servers 100 and 200 can be implemented with Java 2 Platform Enterprise Edition (J2EE) technology.

Clients 300 can be implemented in accordance with any appropriate client technology known in the art. In one embodiment, clients 300 are implemented with one or more Intel processors, Windows 2000 and/or Windows XP Professional operating systems, Microsoft Internet Information Services 5.0, Microsoft Internet Explorer 6.0 software, and appropriate client software and plug-ins supporting the various client functionality further described herein.

The collections of data available from data sources 400 can be associated with one or more "projects" maintained by infrastructure server 100 as an XML file. Each project can comprise one or more "views" corresponding to a subset of the data associated with the project. By opening various views within the projects, users of clients 300 can observe and interact with multi-dimensional representations of the data displayed on clients 300.

In operation, users of clients 300 can log in to a website maintained by infrastructure server 100 in order to access a project. If the user's access is approved by the infrastructure server 100, then the project file can be downloaded to the client 300. The project file provided by the infrastructure server 100 can identify links to various data available from one or more data sources 400. Such linked data may include static data that is infrequently changed, such as data representing maps, fixed structures, or other static data. However, the linked data may also include dynamic data having one or more attributes that are subject to rapid changes in real-time, such as geospatial data referencing vehicle positions, radio frequencies, or other dynamic data.

When client 300 initially accesses a project file, it can download geospatial data from the appropriate data sources 400 linked in the project file by interacting with the data sources 400 over the network 450. It will be appreciated that the client 300 can also download linked data that is maintained by any component in communication with network 450, including servers 100 and 200, as well as other clients 300.

As the geospatial data available from a given data source 400 (or other component) changes over time, the changes can be stored and maintained by collaboration server 200. The changes can be provided to client 300 in response to polling requests made by the client 300 to the collaboration server 200.

System 50 can also facilitate interaction between users of clients 300. Users can make various projects and views available to other users. Users can create annotations that are accessible by other users, thereby permitting users to interact visually with each other through clients 300. It will be appreciated that because the various components of system 50 can communicate through network 450, it is not necessary for clients 300 to be located in close proximity to each other. Indeed, the various clients 300 may be located at extremely disparate locations and still engage in collaboration over network 450.

Figure 2:
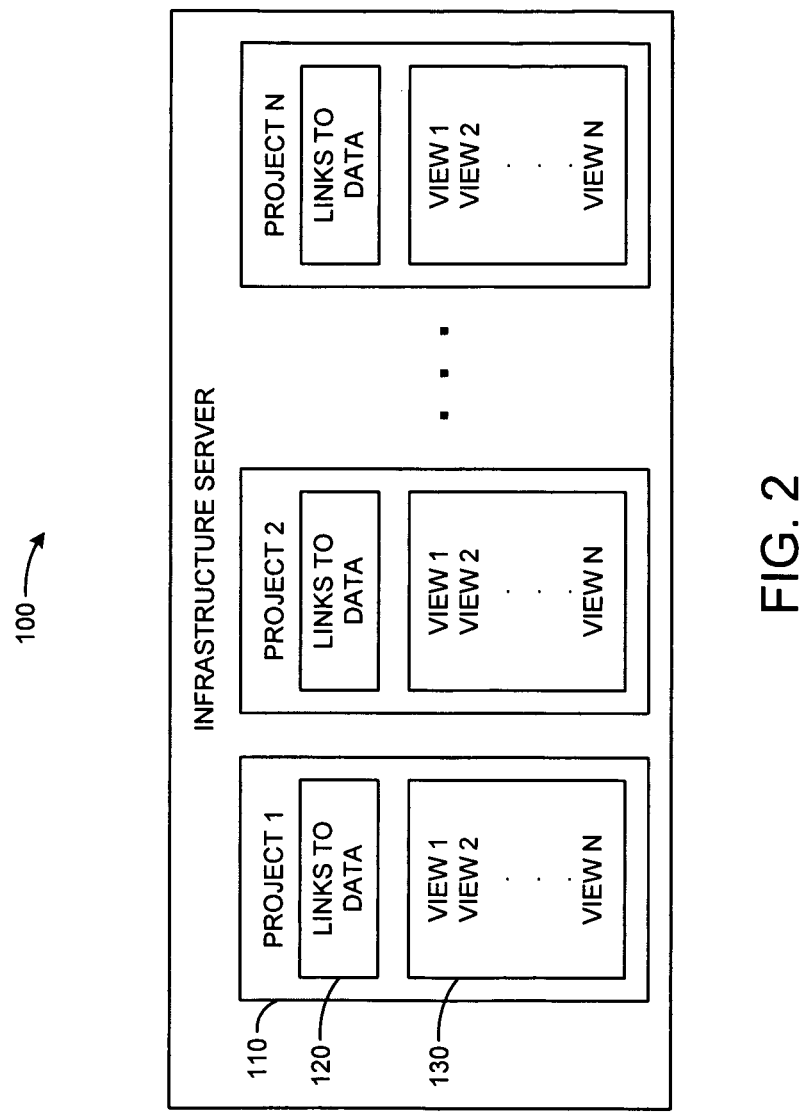
FIG. 2 illustrates a block diagram of several software components running on an infrastructure server in accordance with an embodiment of the present invention.

FIG. 2 illustrates a block diagram of several software components running on an infrastructure server 100 in accordance with an embodiment of the present invention. As illustrated, infrastructure server 100 can maintain a number of project files 110. The manner in which data from data sources 400 can be accessed and viewed by clients 300 can be understood with reference to the projects and views stored by infrastructure server 100. Clients 300 can be permissioned to access one or more projects 110 from infrastructure server 100. Each project can be implemented as an XML document providing a plurality of data fields containing and/or identifying data available from one or more data sources 400 through links 120. A plurality of views 130 can be associated with each project. Each of the views 130 can correspond to a subset of the collection of data associated with the project.

Figure 3:
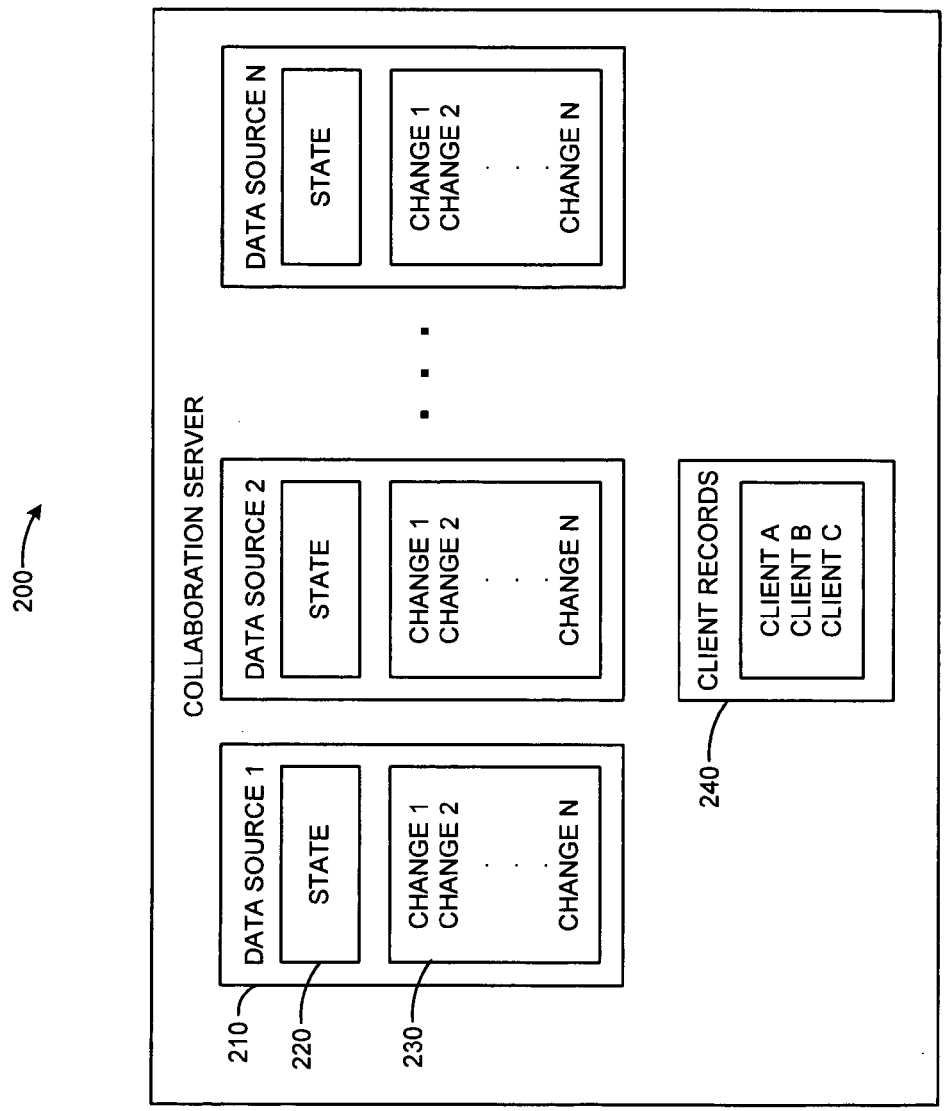
FIG. 3 illustrates a block diagram of several software components running on a collaboration server in accordance with an embodiment of the present invention.

FIG. 3 illustrates a block diagram of several software components running on a collaboration server 200 in accordance with an embodiment of the present invention. As described, collaboration server 200 can facilitate the real-time updating of data provided to clients 300. Collaboration server 200 receives and organizes XML messages from clients 300 and data sources 400, and provides data received from data sources 400 to clients 300 in response to data polling requests issued by clients 300. Collaboration server 200 can be implemented to support XML, active server pages, instant messaging, and can run appropriate dll files to support various functionality of the collaboration server 200 further described herein.

As illustrated, collaboration server 200 maintains a set of data structures 210 for each data source 400 that is referenced by the project 110 currently accessed by each client 300. Data sources 400 and collaboration server 200 can be implemented such that collaboration server 200 is notified and receives updated geospatial data from each data source 400 referenced by the current project 110. The data structures 210 maintained by collaboration server 200 include a state 220 and a list of changes 230 associated with each data source. As collaboration server 200 receives updated data from a data source 400 concerning a particular aspect of geospatial data referenced by the current project 100, collaboration server 200 stores the updated data as an entry in the list of changes 230 for the data structure 210 associated with the data source 400. As additional updated data concerning the same data source 400 is received by collaboration server 200, the updated data is stored as another entry in the list of changes 230. Periodically (for example, approximately every 20 seconds), the collaboration server 200 can compile all of the changes in list 230 into a state 220 that is stored as part of the data structure 210. As further described herein, clients 300 can periodically poll collaboration server 200 to receive the next available change 230 and/or state 220 available in relation to each data source 400 referenced by the project file 110 currently accessed by the client 300.

Collaboration server 200 also maintains records 240, which store a state of each client 300 that is accessing a given project. The state maintained in records 240 can identify the most recent data change and/or update sent by the collaboration server 200 to each client 300. As a result, by accessing records 240, collaboration server 200 can send the next appropriate data change 230 or updated state 220 to the client 300 in response to a polling request issued by the client 300.

Figure 4:
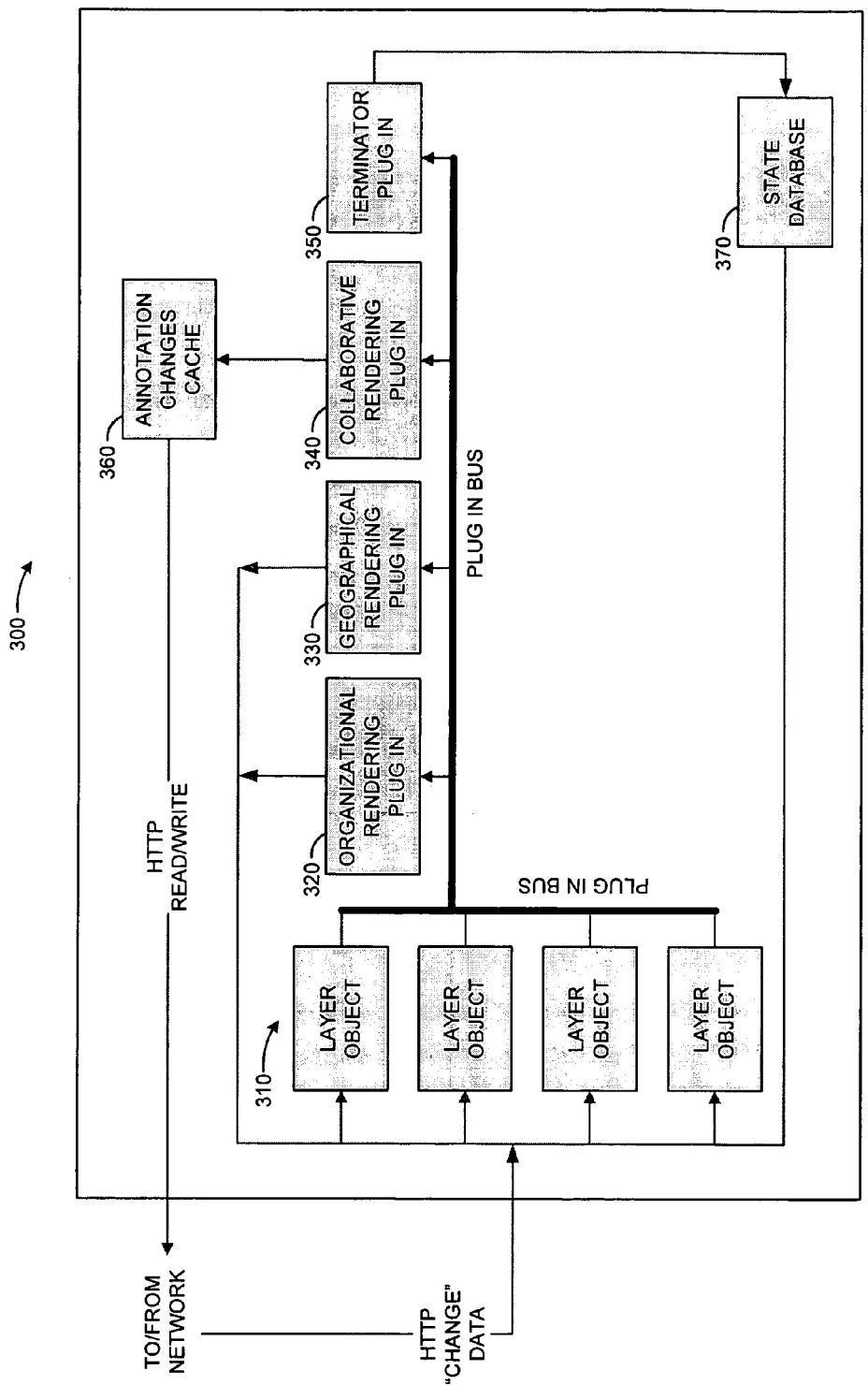
FIG. 4 illustrates a block diagram of several software components running on a client in accordance with an embodiment of the present invention.

FIG. 4 illustrates a block diagram of several software components running on a client 300 in accordance with an embodiment of the present invention. As depicted in FIG. 4, client 300 can exchange data to and from network 450. A plurality of layer objects 310 can be maintained on client 300, with each layer object 310 corresponding to data referenced by the current view of a project being accessed by the client 300. Although four layer objects 310 are illustrated in FIG. 4, it will be appreciated that any number of layer objects 310 can be referenced by a given view and/or project accessed by the client 300. Geospatial data received by client 300 from network 450 can be identified as a layer object 310 and passed to a plug in bus maintained by software running on the client 300.

As illustrated, the plug in bus of client 300 can be implemented to communicate with a plurality of plug ins 320, 330, 340, and 350 and/or other software components maintained on client 300. In various embodiments, each of the plug ins identified in FIG. 4 can be implemented as ActiveX plug ins running in conjunction with an Internet browser on the client 300.

Organizational rendering plug in 320 provides for the hierarchical organization of geospatial data received through the layer objects 310. Geographical rendering plug in 330 renders graphics to be displayed on the client 300 in response to geospatial data received through the layer objects 310. Collaborative rendering plug in 340 renders annotations and/or other elements created by a user of the client 300. Such annotations and elements can be passed by the collaborative rendering plug in 340 to an annotation changes cache 360 and forwarded over network 450 to various components of system 50 in the form of HTTP read/write commands or other formats, as further described herein. Terminator plug in 350 updates a state database 370 also running on client 300. By maintaining the state database 370, the client 300 can store and access the state of any geospatial data received and/or sent by the client in relation to the current view accessed by the client.

The operation of system 50 and its various components will now be explained in further detail with reference to the processes illustrated in FIGS. 5 through 9.

Figure 5:
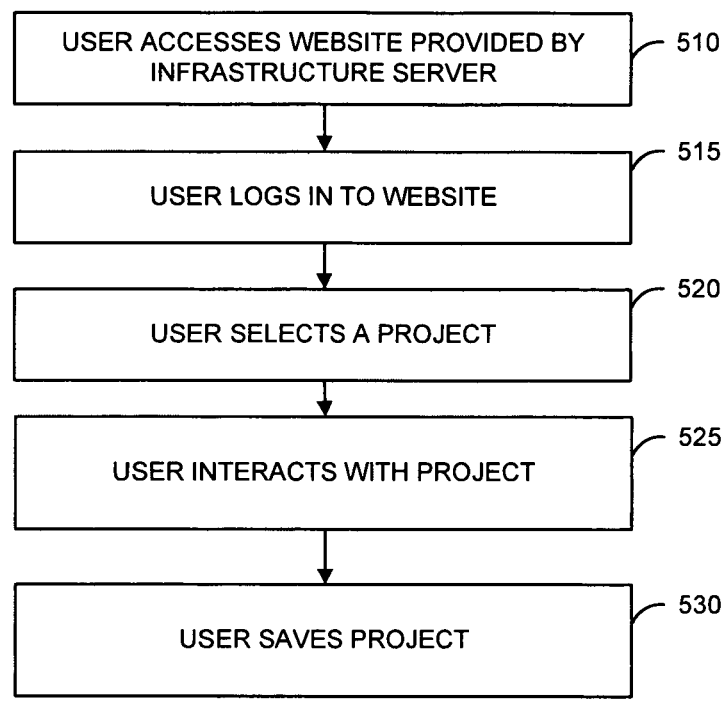
FIG. 5 is a flowchart illustrating a process for facilitating user interaction with a system in accordance with an embodiment of the present invention.

FIG. 5 is a flowchart illustrating a process for facilitating user interaction with a system in accordance with an embodiment of the present invention. It will be appreciated that the process of FIG. 5 provides an example of various steps that can be performed by a user when interacting with a client 300 of system 50.

At step 510, the user interacts with client 300 to access a website provided by infrastructure server 100. The user then logs in to the website by providing sufficient authentication and/or authorization credentials (step 515). If the user's login is approved by the infrastructure sever 100, then the user selects a project 110 from the available projects maintained by the infrastructure server 100 that the user has permission to access (step 520). Thereafter, the user interacts with the project 110 (step 525). It will be appreciated that such interaction can include the viewing of geospatial data in real-time, collaborating with users of other clients 300, and/or interacting with those other users as further described herein. When the user is finished interacting with the project 110, the user can choose to save the project 110 on the infrastructure server 100.

Figure 6:
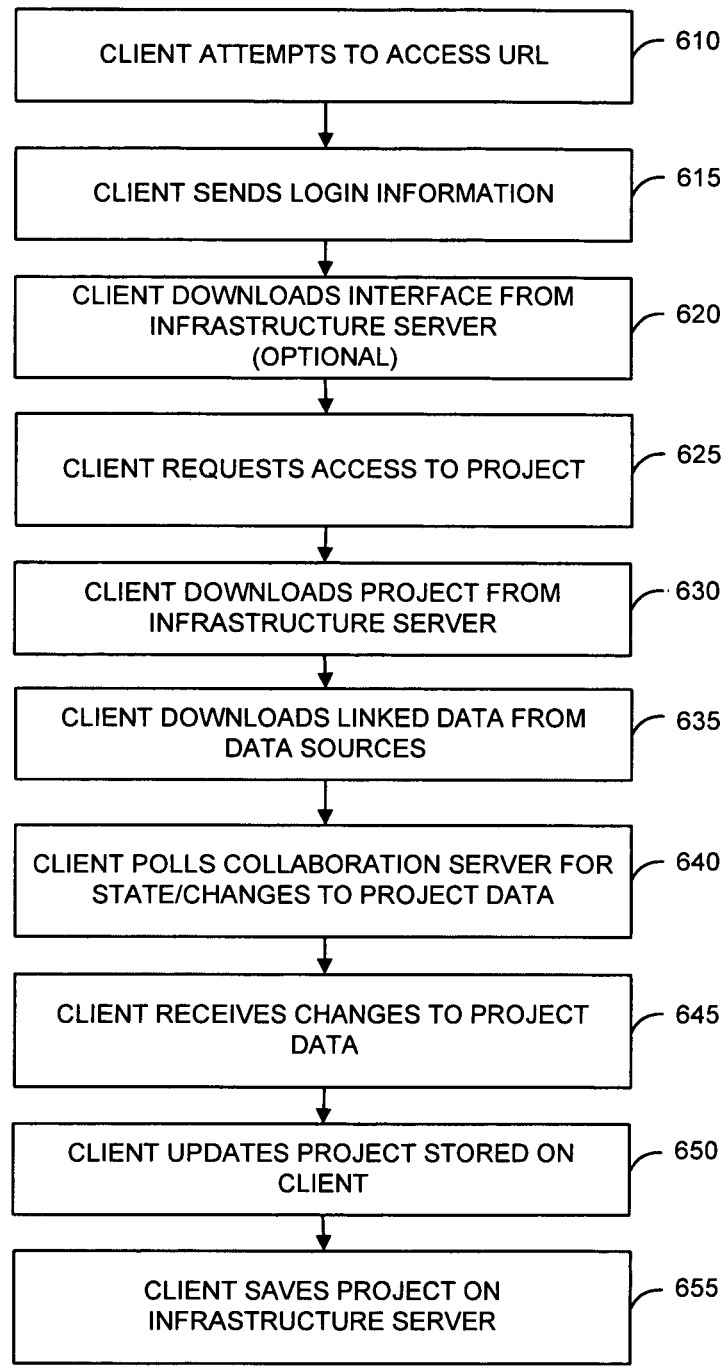
FIG. 6 is a flowchart illustrating a process for providing client communication in accordance with an embodiment of the present invention.

FIG. 6 is a flowchart illustrating a process for providing client communication in accordance with an embodiment of the present invention. It will be appreciated that the process of FIG. 6 provides an example of various steps performed by a client 300 when interacting with a user and various components of system 50.

At step 610, the client attempts to access a URL associated with a website maintained by infrastructure server 100. If the website is successfully accessed by client 300, then the client 300 sends the user's login information to the website (step 615). It will be appreciated that steps 610 and 615 can be performed in response to various steps initiated by a user of client 300. For example, step 610 can be performed by client 300 in response to a user's attempt to access such a website in step 510 of FIG. 5 previously described herein. Similarly, step 615 can be performed by client 300 in response to a user's attempt to log in to the website in step 515 of FIG. 5.

In optional step 620, client 300 can download appropriate user interface software from infrastructure server 620 in order to facilitate the viewing and processing of geospatial data in relation to appropriate projects and views in accordance with an embodiment of the present invention. Typically, such a download can be implemented when a client 300 is initially deployed for interaction with system 500. It will be appreciated that because the interface software (for example, the software components of client 300 illustrated in FIG. 4) can be downloaded from the infrastructure server 100, clients 300 can be easily deployed worldwide and need not be equipped with cumbersome specialized software applications in order to successfully interact with system 50.

At step 625, the client 300 requests access to a project 110 from infrastructure server 100. It will be appreciated that step 625 can be performed by client 300 in response to a user's selection of a project 110 in step 520 of FIG. 5. If the client's request is approved by infrastructure server 100, then the client 300 proceeds to download the project file 110 from infrastructure server 100 (step 630) and also downloads the various geospatial data referenced by the project file 110 (step 635). Generally, the data downloaded in step 635 can be data downloaded by the client 300 from any of the data sources 400 referenced by the project file 110. For example, if the project file 110 references various graphical elements (i.e. maps, etc.) available from certain data sources 400, the client 300 can initially download such data from those data sources 400 over network 450. Similarly, if the project file 110 references other data (for example, vehicle positions, radio frequencies, etc.), then such data may also be downloaded from appropriate data sources 400 over network 450.

As previously discussed, geospatial data available from various data sources 400 can change over time. As a result, some of the geospatial data downloaded by client 300 in the initial download operation of step 635 can become stale as new data becomes available. In accordance with an aspect of the present invention, the client 300 need not re-download all of the geospatial data referenced by the current project when only a subset of the geospatial data referenced by the current project 110 has changed. Rather, client 300 can advantageously download only the updated state and/or changes to such data as maintained by collaboration server 200 in data records 210. It will be appreciated that by downloading changed data to the client 300, current geospatial data can be communicated to clients 300 in an efficient manner without undue network congestion.

Therefore, in step 640, client 300 polls collaboration server 200 for any updated state or changes to the geospatial data referenced by the current project 110. If updated data is available, then it can be received by the client in step 645 and updated in the project currently accessed by the client 300 (step 650). It will be appreciated that steps 640, 645, and 650 can be performed periodically by client 300. For example, in one embodiment, client 300 periodically polls collaboration server 200 approximately every 1.5 seconds, thereby allowing the client 300 to receive and update relevant project data in real-time.

At step 655, client 300 can save the current project 110 on infrastructure server 100. It will be appreciated that step 655 can be performed by client 300 in response to a user's selection to save a project 110 in step 530 of FIG. 5.

Figure 7:
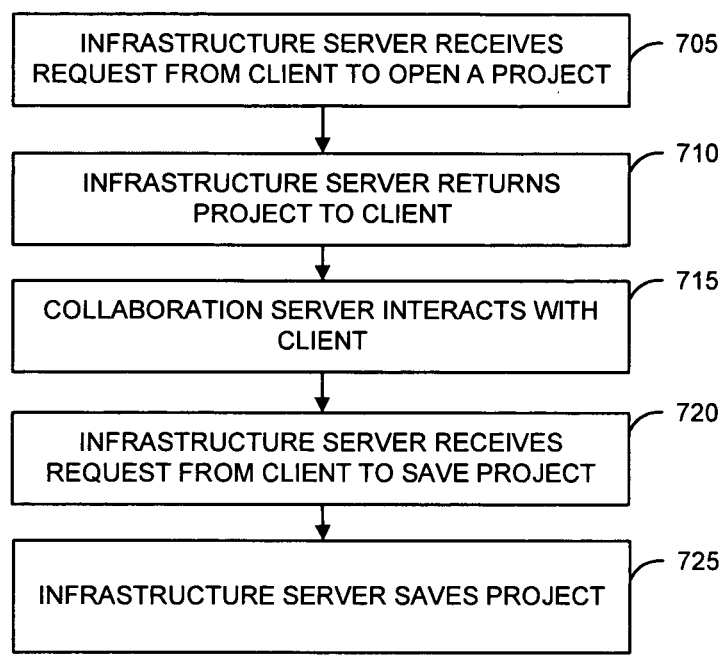
FIG. 7 is a flowchart illustrating a process for providing server communication in accordance with an embodiment of the present invention.

FIG. 7 is a flowchart illustrating a process for providing server communication in accordance with an embodiment of the present invention. It will be appreciated that the process of FIG. 7 provides an example of steps performed by servers 100 and 200 when interacting with client 300 of system 50.

At step 705, infrastructure server 100 receives a request from a client 300 to open a project file 110 maintained on the infrastructure server 100. It will be appreciated that step 705 can be performed by infrastructure server 100 in response to a user's selection of a project 110 in step 525 of FIG. 5. The infrastructure server 100 then returns the selected project to the client 300 (step 710) which is received by the client 300 in step 630 of FIG. 6.

In step 715, the collaboration server 200 interacts with the client 300 in accordance with various steps described herein in relation to FIGS. 6, 8A, 8B, and 9. After the interaction between collaboration server 200 and client 300 is complete, the infrastructure server 200 receives a request from the client 300 to save the currently accessed project 110 (step 720). It will be appreciated that step 720 can be performed by infrastructure server 100 in response to a user's selection to save a project 110 in step 530 of FIG. 5. Thereafter, the project 110 is saved by the infrastructure server 100 (step 725).

Figure 8A:
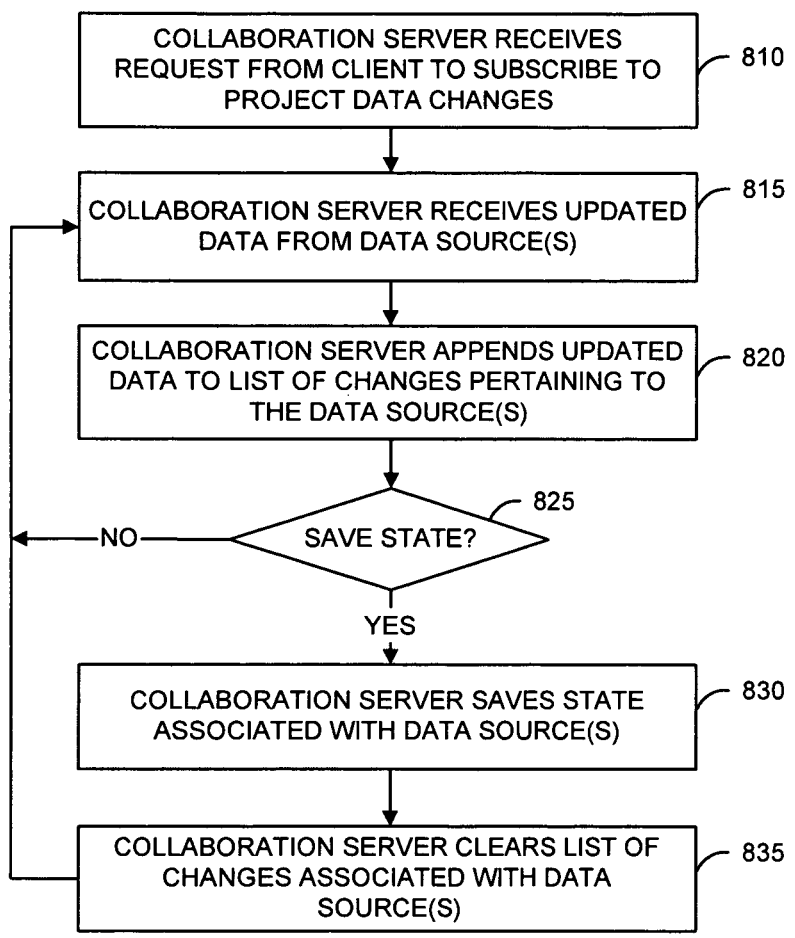
FIGS. 8A and 8B are flowcharts illustrating processes for providing a client with data changes in accordance with an embodiment of the present invention.
Figure 8B:
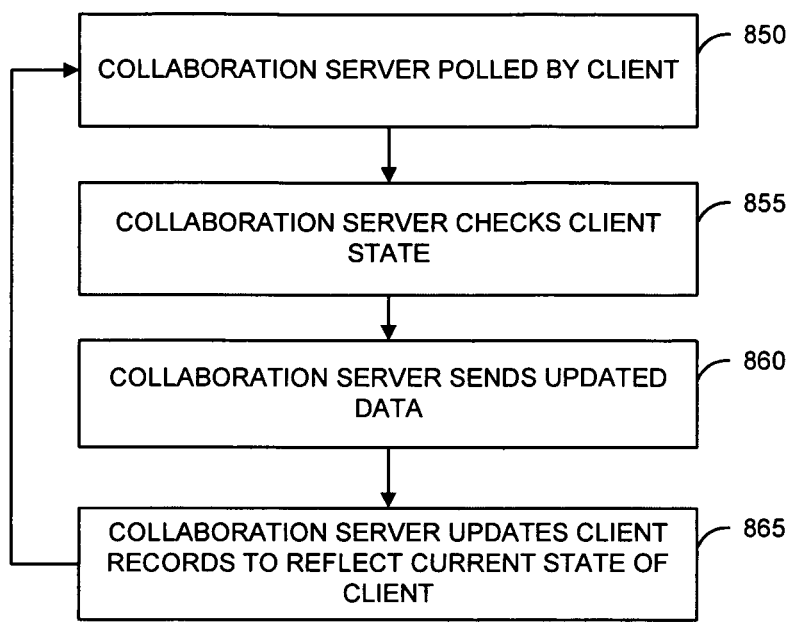

FIGS. 8A and 8B are flowcharts illustrating processes for providing a client 300 with data changes in accordance with an embodiment of the present invention. It will be appreciated that the processes of FIGS. 8A and 8B provide examples of steps performed by collaboration server 200 when interacting with client 300 during step 715 of FIG. 7.

Referring to FIG. 8A, the collaboration server 200 receives a request from the client 300 to subscribe to project data changes (step 810). For example, this step can be performed in response to a client 300 accessing a project 110 stored on infrastructure server 100. At step 815, the collaboration server 200 receives updated data from one of more data sources 400 referenced by the current project 110. In response, the collaboration server 110 appends the updated data to the list of changes 230 maintained on collaboration server 110 that pertain to the data sources sending the updated data (step 820).

As set forth in the recursive steps 825, 830, and 835 of FIG. 8A, the collaboration server can periodically (for example, approximately every 20 seconds) update the state of each data source referenced by the current project. It will be appreciated that this can be accomplished by saving the state 220 maintained by the collaboration server 220 to include all of the data changes maintained in data change list 230 (step 830). After the state is saved, the collaboration server 200 can then clear the data change list 230 associated with the data source (step 835).

Referring to FIG. 8B, the collaboration server 200 can periodically perform additional steps 850, 855, and 860 at any desired time during the iterative process of FIG. 8B. At step 850, collaboration server 200 is polled by client 300 for any updated data associated with the current project 110. It will be appreciated that step 850 can result from a polling operation performed by client 300 in step 640 of FIG. 6.

In response, collaboration server 200 checks client records 240 to determine the current state of the client 300 issuing the polling operation. If updated/changed data has become available since the client state was last updated, then collaboration server 200 sends the updated data to the client 300. For example, if the client state indicates that "CHANGE 1" data referenced by data change list 230 was the most recent changed data sent to the client 300, then collaboration server 200 will proceed to send the "CHANGE 2" data referenced in the data change list 230 (step 860). Similarly, if no entries are found in the change data list 230, but the state 220 of the data source 400 has been updated, then the updated state of the data source 400 can be sent in step 860. Thereafter, at step 865, the collaboration server 200 updates client records 240 to reflect the current state of the client 300 (i.e. the various data changes most recently sent to the client 300).

It will be appreciated that by maintaining various data change lists 230 on collaboration server 200, the state of each data source 400 need not be re-saved to reflect all data associated with the data source 400. Rather, data changes can be appended to the data change lists 230 and sent to the clients 300 in response to polling requests issued by the clients 300. As a result, the time at which the complete state of each data source 400 is periodically saved on collaboration server 200 can be selected to optimize communication between the various components of system 50 and minimize the time-intensive task of re-saving the complete state of the data source 400.

Figure 9:
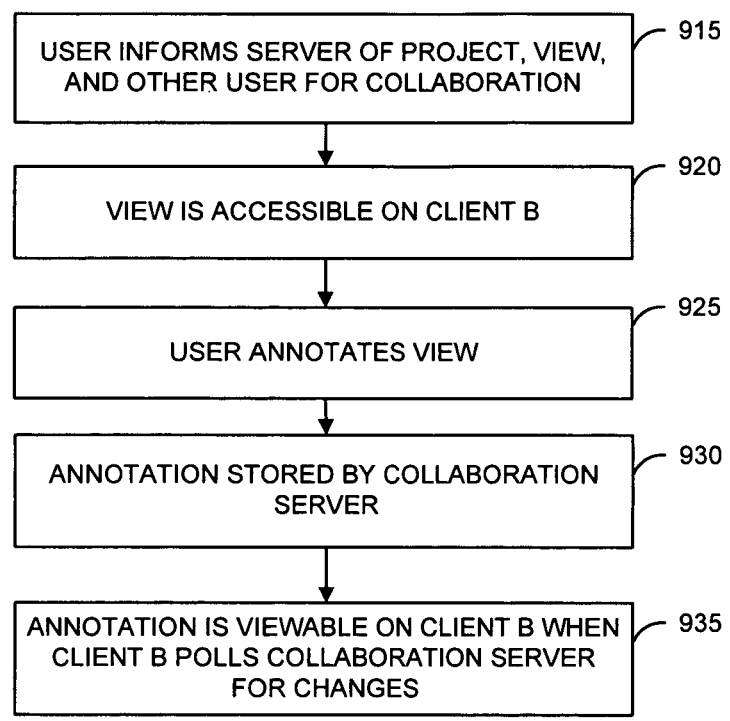
FIG. 9 is a flowchart illustrating a process for facilitating user collaboration of geospatial data in accordance with an embodiment of the present invention.

In another aspect of the present invention, collaboration between users of clients 300 can be facilitated through the sharing of geospatial data, and by providing appropriate software for allowing the users to communicate annotations to geospatial data in real-time. FIG. 9 is a flowchart illustrating a process for facilitating user collaboration of geospatial data in accordance with an embodiment of the present invention.

As previously discussed, each of the projects 110 maintained by infrastructure server 100 can have various associated views 130. In step 915, a user (for example, a user of client A in FIG. 1) interacts with the interface provided by the client 300 in order to inform the collaboration server 200 of another user with which the user seeks to collaborate. For example, the client 300 can send a request to infrastructure server 100 identifying a URL and/or other identifier associated with a particular client (i.e. client B of FIG. 1). The request of step 915 can also identify the particular project 110 and view 130 of client A that is to be shared with client B.

In order to maintain the security of each user's data, different users/clients of system 50 may have different projects, views, and data that each user is authorized to view. Accordingly, in response to step 915, the infrastructure server 100 can adjust security settings associated with the particular project 110 and view 130 in order to allow client B to also access client A's project/view. As a result, the particular project 110 and view 130 of client A can be accessed by client B (step 920). It will be appreciated that while clients A and B are accessing the same project 110 and view 130, each client can continue to receive updated data in real-time in accordance with the various processes previously described herein. Accordingly, both clients A and B can view the same graphical representation of geospatial data associated with a given project and view.

In addition, annotations made by each client 300 can be communicated to each other through the following steps. At step 925, a user of one of the clients 300 (for example, client A) interacts with the user interface of client A to create an annotation (for example, a line, remark, or other graphical annotation) to the geospatial data displayed therein. As a result, the client A can generate an XML representation of the annotation and upload the annotation to the collaboration server 200. In response, the collaboration server 200 can treat the annotation as another data source to be associated with the current project 110 and view 130. Accordingly, the collaboration server 200 can create an additional data structure 210 corresponding to the annotation (step 930).

When client B eventually polls the collaboration server 200 for changes (for example in accordance with step 640 of FIG. 6), it can receive the relevant data pertaining to the annotation, causing the annotation to thereafter be viewable in the user interface of client B (step 935).

It will be appreciated that the data structure 210 for the annotation can initially be stored with a state 220 identifying the complete set of data associated with the annotation. Moreover, if updates to the annotation are made (for example, by a user of client A manipulating the annotation in the user interface of client A), then such changes can be sent from client A to the collaboration server 200, causing the collaboration server 200 to process such changes in accordance with the relevant steps of FIGS. 8A and 8B. As a result, each of clients A and B can share annotations with each other and view updates to such annotations in real-time. This process thereby enhances the ability of users of various clients 300 of system 50 to collaborate and exchange information in relation to geospatial data referenced by system 50.

In another aspect of the present invention, users of various clients 300 can further collaborate with each other over network 50 using various views 130 associated with projects 110. For example, a client 300 (i.e. client A) can collect geospatial data, annotation data (i.e. geospatial data in the form of annotations provided by a user for collaboration purposes), and a plurality of unique views 130 into a single view 130 which the client A has permission to access. The client A can communicate a state 370 of the client A to a second client (for example, client B), the state comprising annotation data, geospatial data, and viewing parameters (i.e. user interface settings such as a flat or spherical representation of geospatial data). Client A can invite client B to access the view 130, thereby granting the user of client B permission to access the view 130. The users of clients A and B can then be permitted to share and work interactively in real time within the view 130, with each user having no knowledge of other views which the user is not permissioned to access. These various steps can further be repeated for a plurality of views 130, allowing users of clients 300 to collaborate in realtime and have the various views 130 in the plurality of views 130 be updated simultaneously in realtime.

Where applicable, the present invention can be implemented using hardware, software, or combinations of hardware and software. Also where applicable, the various hardware components and/or software components set forth herein can be combined into composite components comprising software, hardware, and/or both without departing from the spirit of the present invention. Where applicable, the various hardware components and/or software components set forth herein can be dissected into sub-components comprising software, hardware, or both without departing from the spirit of the present invention. In addition, where applicable, it is contemplated that software components can be implemented as hardware components, and vice-versa.

Software in accordance with the present invention, such as program code and/or data, can stored on one or more computer readable mediums. It is also contemplated that software identified herein can be implemented using one or more general purpose or specific purpose computers and/or computer systems, networked and/or otherwise.

Where applicable, the ordering of various steps described herein can be changed, combined into composite steps, and/or dissected into sub-steps to provide the functionality described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

For example, it is contemplated that the present invention can be utilized to provide communication services for Intranet, Internet, and wireless appliances for use by collaborative workgroups and organizations which enables focused and timely delivery of spatially organized information for multiple applications and market segments. It is further contemplated that additional functionality can be provided by one or more components of system 50 for transforming/converting geospatial data between flat and spherical representations of data, thereby permitting data of either representation to be used in accordance with the various processes described herein.

What is claimed is:

1. A machine-implemented method for facilitating collaborative client interaction with a collaborative project including geospatial data over a network, the method comprising:

accessing the collaborative project maintained by an infrastructure server, the collaborative project comprising a plurality of views incorporating geospatial data from a plurality of data sources, the collaborative project further comprising reference links to the geospatial data available from the plurality of data sources;

storing, by a collaboration server, a set of data structures for each of the plurality of data sources referenced by the collaborative project and a state of each client accessing the collaboration project, wherein each set of data structures includes a state and a list of changes associated with each of the plurality of data sources and further wherein the state is a periodic compilation of the list of changes associated therewith which is continually updated by the collaboration server responsive to received changes to the geospatial data from the plurality of data sources;

downloading at least one of the plurality of views incorporating geospatial data linked to the collaboration project to a requesting client, the linked geospatial data being downloaded from each of the plurality of data sources in accordance with the reference links;

receiving by the collaboration server, a polling request from the requesting client to the collaboration server for compiled updates to the downloaded view including updated geospatial data from one or more sets of data structures; and downloading an updated at least one of the plurality of views incorporating updated geospatial data linked to the collaboration project to the requesting client, the updated linked geospatial data being downloaded from each of the plurality of data sources in accordance with the reference links.

2. The method of claim 1, the method further comprising: downloading software for providing a user interface on the client.

3. The method of claim 1, the method is performed by a client.

4. The method of claim 1, the one of the plurality of data sources is a second client, the geospatial data is an annotation prepared by a user of the second client, thereby allowing the user of the second client to collaborate with a user of the first client.

5. The method of claim 1, the geospatial data is in an XML format.

6. The method according to claim 1, wherein accessing the collaborative project maintained by an infrastructure server requires the requesting client to provide credentials.

7. The method according to claim 1, wherein the requesting client is one of the plurality of data sources and further wherein the requesting client provides changes to the geospatial data associated with one or more of the plurality of views to the collaboration server.

8. The method according to claim 1, wherein the periodic compilation of the list of changes is performed by the collaboration server approximately every 20 seconds.

9. A system for facilitating collaborative client interaction with a collaborative project including geospatial data over a network, the system comprising:

an infrastructure server for storing the collaborative project and providing access thereto by one or more clients, the project comprising a plurality of views incorporating geospatial data from a plurality of data sources, the collaborative project further comprising reference links to the geospatial data available from the plurality of data sources;

a collaboration server for
storing, a set of data structures for each of the plurality of data sources referenced by the collaborative project and a state of each client accessing the collaboration project, wherein each set of data structures includes a state and a list of changes associated with each of the plurality of data sources and further wherein the state is a periodic compilation of the list of changes associated therewith which is continually updated by the collaboration server responsive to received changes to the geospatial data from the plurality of data sources;

downloading at least one of the plurality of views incorporating geospatial data linked to the collaboration project to a requesting client, the linked geospatial data being downloaded from each of the plurality of data sources in accordance with the reference links;

receiving a polling request for compiled updates to the downloaded view including updated geospatial data from one or more sets of data structures; and downloading an updated at least one of the plurality of views incorporating updated geospatial data linked to the collaboration project to the requesting client, the updated linked geospatial data being downloaded from each of the plurality of data sources in accordance with the reference links.

10. The system of claim 9, wherein the client downloads software for providing a user interface on the client.

11. The system of claim 9, the one of the plurality of data sources is a second client, the geospatial data is an annotation prepared by a user of the second client, thereby allowing the user of the second client to collaborate with a user of the first client.

12. The system of claim 9, the geospatial data is in an XML format.

13. The system of claim 9, wherein the requesting client comprises a plug in bus and one or more plug ins for organizing, geographically rendering and collaboratively rendering the downloaded at least one of the plurality of views and the geospatial data incorporated therein.

14. The system of claim 13, further comprising an annotation changes cache, wherein the one or more plug ins for collaboratively rendering the downloaded at least one of the plurality of views and the geospatial data incorporated therein renders annotations and elements to the downloaded view created by the requesting client and passes rendered annotations and elements to the annotation changes cache for forwarding to the collaboration server.

* * * * *